May 13, 1941.  A. L. W. WILLIAMS ET AL  2,241,837
DAMPING MEANS
Filed Nov. 14, 1938    2 Sheets-Sheet 1
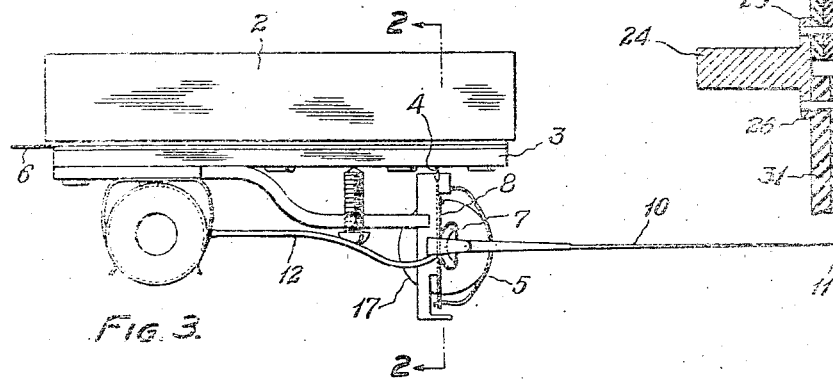
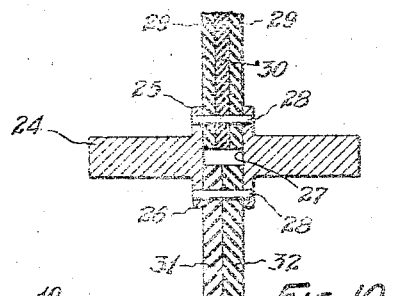
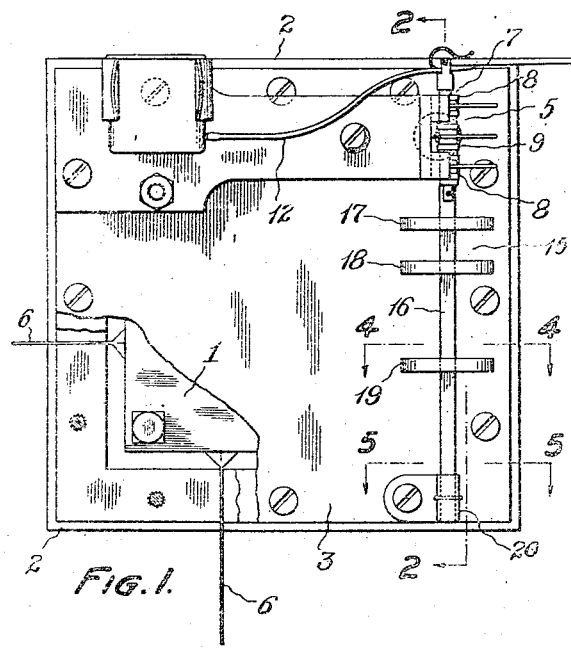
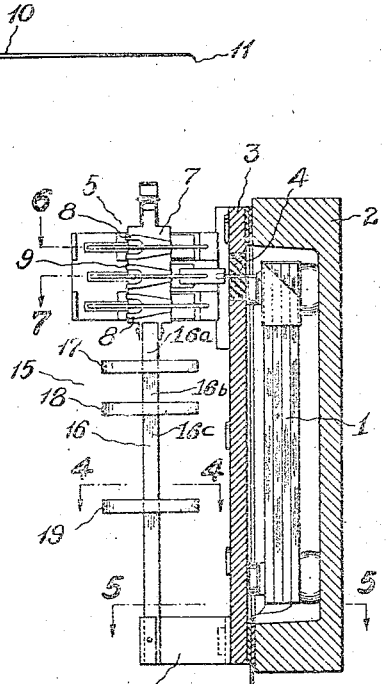
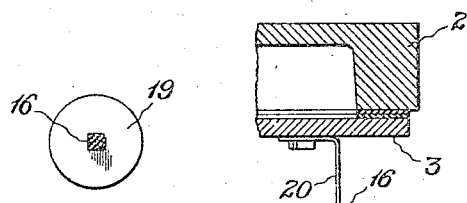
INVENTORS:
ALFRED L. W. WILLIAMS
JOSEPH J. NEFF
BY G. G. Christensen
ATTORNEY INVENTORS:
ALFRED L. W. WILLIAMS
JOSEPH J. NEFF
BY G. G. Christensen
ATTORNEY Patented May 13, 1941

2,241,837

UNITED STATES PATENT OFFICE

2,241,837

DAMPING MEANS

Alfred L. W. Williams, Cleveland Heights, and Joseph J. Neff, Cleveland, Ohio, assignors to The Brush Development Company, Cleveland, Ohio, a corporation of Ohio Application November 14, 1938, Serial No. 240,260

10 Claims. (Cl. 188—1)

This invention relates to vibratory devices and more particularly to means for damping the vibrations of the moving parts of such devices.

An object of this invention is to provide improved selective damping means for vibrating devices, i. e., means which damp only vibrations of certain frequencies without appreciably damping vibrations of other frequencies within the range of operation of the device.

A further object of this invention is to provide improved selective damping means for vibratory devices the selective damping effect of which is readily adjustable.

Devices such as oscillographs, phonograph record cutters, pickups, loud speakers, microphones and various machines have mechanisms which in operation partake of a vibratory motion such as a reciprocating motion or an oscillatory torsional vibration. In general these devices have, as a part of the vibrating system, an element which has in part the properties of a spring and which returns the vibratory system to its normal position upon removal of an actuating force.

In these devices it often happens that the restoring force of such spring element and the inertia of the vibrating parts react to produce undesirable resonance effects. The response of such devices to steady state sinusoidal vibratory forces is generally greater near the frequency of mechanical resonance than at other frequencies and the response of such devices to transient impulses is often far from faithful. These effects are usually undesirable. For example, in acoustic devices they give rise to distortion of the reproduced sounds. In devices such as oscillographs they result in false records of the applied electrical waves and transient impulses. To reduce or eliminate these effects, damping means are usually employed.

Various damping means for vibratory devices are well known to the art. For example, United States Patent 1,663,884 to H. C. Harrison shows a long rubber tube coupled to the stylus mechanism of a phonograph device so as to be torsionally vibrated thereby. The rubber tube absorbs sufficient energy from the vibrating system to reduce the effects of the above mentioned resonance conditions. United States Patent 1,678,116 to H. C. Harrison shows a loaded and damped bar or rod coupled to various vibrating devices for damping purposes. Both of the above systems are designed to absorb energy over a wide range of frequencies, i. e., are non-selective, and this is a desirable characteristic in many devices. United States Patent 1,905,723 to Landsman shows a block or bar of reclaimed rubber supported and torsionally vibrated by a phonograph mechanism. This arrangement provides selective damping, i. e., damping only at certain frequencies, and this is a very desirable characteristic in certain designs of vibratory devices. Another example of selective damping means is the phonograph pickup of H. C. Harrison, No. 2,031,948, having a disc of damping material carried by the reciprocating stylus member.

It has been found that in some vibratory devices such as, for example, the direct ink recording piezo-electric oscillograph disclosed in U. S. Patent No. 2,149,216, granted February 28, 1939, to Charles K. Gravley, damping means at present known to the art are not entirely satisfactory. For example, in the above mentioned device a short bar of damping material has been secured to the torsional member and to the frame to absorb energy from the system. This arrangement reduces the sensitivity of the device at low frequency where no damping is required and only partially suppresses the resonance effects. Other damping arrangements, including some of the known selective systems, have also been found unsuitable.

It is our discovery that the damping characteristics of a tuned damping unit may be advantageously altered by coupling to the unit vibration dissipating means which are adapted to absorb and dissipate energy from the unit and which preferably comprises an additional body of damping material either with or without other modifying elements. This principle is applicable to tuned damping units in which the damping material is vibratorily twisted, bent, compressed or otherwise distorted. The additional body of damping material may be coupled thereto so as to be subjected to the same type of vibratory distortion as occurs in the tuned unit or so as to be subjected to any other suitable type of distortion. By incorporating a plurality of elements in a tuned damping device, the designer has greater latitude in adjusting the device to meet various conditions. The effectiveness of the bodies of damping material may be adjusted by varying their dimensions and compositions and the type of distortion to which each is subjected. When additional mass elements are employed their inertia effects may also be varied.

In the preferred form of the present invention a bar or rod of suitable damping material such as reclaimed rubber, synthetic rubber, or other rubber like material is coupled to the vibratory device in a manner to be subjected to torsional vibrations. Adjustably supported along the bar or rod are a plurality of masses in the form of discs or plates. The stiffness and damping effect of the rod together with the various masses are so proportioned that the vibratory system is damped only at certain frequencies. The magnitude of the damping effect and the frequency of maximum damping are adjustable within limits by adjusting the positions of the masses on the rod. Such a device consists of a plurality of damping units energized in sequence and interacting upon each other and upon the vibratory system to effect selective damping of the latter. The first section of the damping bar and the first disc or plate coact to form a primary tuned damping unit while the balance of the damping bar and the additional masses constitute vibration dissipating means which receive and dissipate energy from the primary unit, thereby modifying the damping effect of the primary unit. Analogous arrangements of a plurality of masses carried by a body of damping material may be employed for selective damping of other kinds of vibratory motion, such as reciprocating motion.

The invention will now be described with reference to the accompanying drawings in which, Fig. 1 is a front elevation of a piezo-electric oscillograph device embodying the damping means of this invention.

Fig. 2 is a sectional view of the device of Fig. 1, taken along line 2, 2.

Fig. 3 is a plan view of the device of Fig. 1.

Figs. 4 and 5 are enlarged sectional views taken along lines 4, 4 and 5, 5 respectively of Fig. 1.

Figure 6:
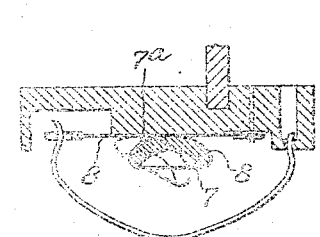
Figure 7:
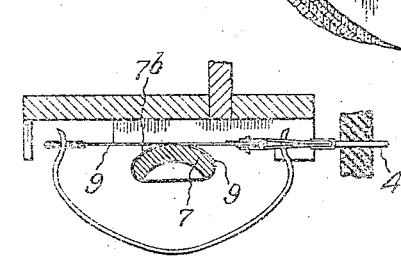

Figs. 6 and 7 are enlarged sectional views taken on the planes indicated by the lines 6 and 7 respectively of Fig. 2.

Figure 8:
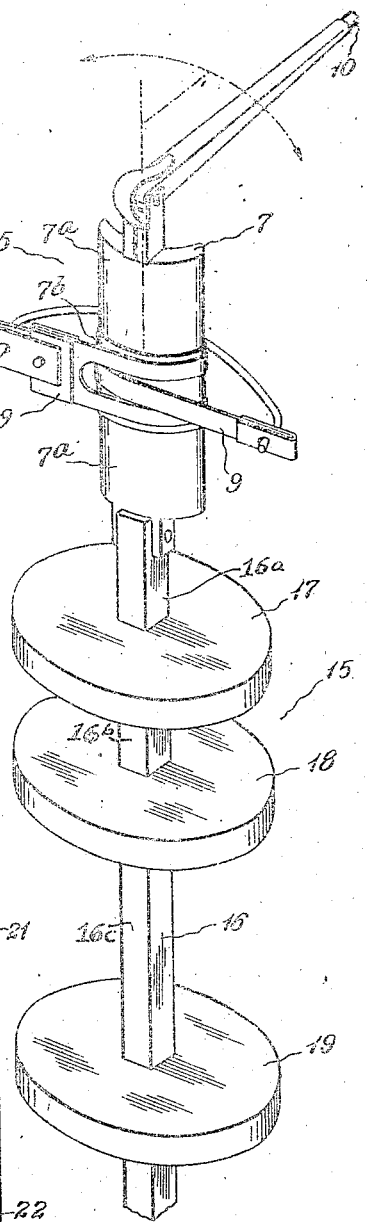

Fig. 8 is an enlarged schematic representation of the various elements involved in the device of Figs. 1, 2 and 3.

Figure 9:
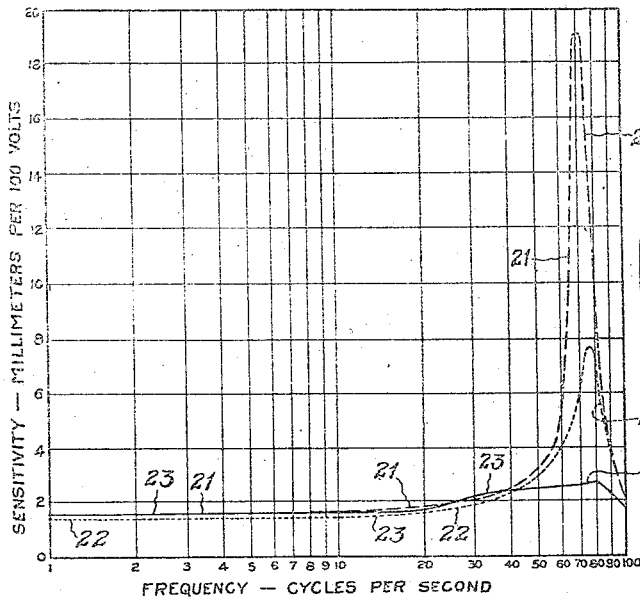

Fig. 9 is a graphical representation of the frequency response of the assembly of Fig. 8 when undamped, when damped with prior damping means, and when damped with the improved means of this invention.

Fig. 10 is an enlarged sectional elevation of a portion of a modified structure of the damping unit, and shows the use of lengths of composite damping material between successive masses.

The device shown in the drawings is merely an illustration of one successful application of the damping means of this invention, and should not be considered in a limiting sense since the damping means are capable of general use in systems which involve vibratory motion. Referring now to Figs. 1 through 8, the device comprises a piezo-electric crystal unit 1 supported in a metal housing composed of a box 2 and a cover plate 3. The crystal unit 1 is connected at one corner by a drive member 4 to a motion converting mechanism 5. An alternating potential applied between terminals 6, 6 causes endwise displacement of drive member 4 which is transmitted to the motion converting mechanism. The spindle 7 has two curved surfaces 7a, 7a of one radius and another curved surface 7b of slightly larger radius. It is operatively supported by flexible tension members 8, 8 so that it may roll back and forth a small distance along the plane defined by members 8, 8 as shown more clearly in Fig. 6. A similar flexible tension member 9 is frictionally mounted on the curved surface 7b and connected to the drive member 4. A long hollow tube 10 terminating in a glass pen point 11 is secured to the spindle. Due to the slight difference in the length of the radii of surfaces 7a and 7b, a slight endwise motion of drive member 4 in response to an applied electromotive force between terminals 6, 6 results in a relatively large angular motion of the spindle 7. This angular motion causes a large motion of the pen point 11.

In operation a strip of paper is arranged to move under the pen point and ink is fed to the pen through a flexible tube 12. The pen point traces a graph on the moving strip of paper of the electrical waves applied between the terminals. For a detailed description of the operation of this device, reference may be made to United States Patent No. 2,149,216 of Charles K. Gravley.

Due to the stiffness of the crystal unit 1 and the inertia of the vibratory members, the system displays the resonance effects previously mentioned. In the device shown in the above mentioned Gravley patent, these effects are reduced by a bar of damping material secured to the frame and to the spindle in the manner to be vibratorily twisted by the motion of the spindle. In the present device this bar is replaced by a damping mechanism similar to that shown generally at 15 in Figs. 1 and 2. It comprises a relatively long bar 16 of damping material secured at one end to the bottom of the spindle and discs 17, 18 and 19 supported by the bar. For convenience the discs are all of the same size and are held on the bar by friction so that their positions may be readily adjusted by application of a little force. The oscillatory motion of the spindle 7 is transmitted to the damping mechanism which oscillates substantially as a whole at low frequencies. At higher frequencies the inertia of the discs 17, 18 and 19 causes flexing of the bar 16 in various amounts with a consequent absorption or dissipation of energy.

A clamp 20 holds the bottom end of the bar 16 to prevent its displacement when the device is carried or shipped, or when the device is operated with the damping mechanism in a horizontal position. The clamp may, if desired, be placed at a sufficient distance from the discs so that it will have little or no effect on the operation of the mechanism.

As is pointed out in the above mentioned Gravley patent, the spindle 7 does not oscillate about a fixed axis but instead partakes of a back and forth rolling motion. This motion is made up of two components; one is an oscillation about the center of curvature of the spindle and the other is a motion of translation parallel to the plane on which the spindle rolls. However, for most purposes, the spindle may be considered to have a torsional motion about an effective axis defined by the line of tangency between the tensioned supporting members 8, 8 and the curved surfaces 7a, 7a of the spindle and it will be noted that the damping bar 16 is substantially in alignment with this axis. Obviously the construction of the present damping means is well suited to operation with devices of this nature since the bar 16 is of flexible yielding material and can therefore adapt itself to the slight back and forth motion of the effective axis of torsion as the spindle partakes of its oscillatory rolling motion.

The elements which make up the essential operating structure of this device are shown schematically and enlarged in Fig. 8, and through reference to this figure it will be possible to explain the operation more clearly.

It will be understood that in operation the arm 10 will swing to and fro on application of alternating voltages to the crystal unit, and the amplitude of motion will more or less faithfully follow the applied voltage. Due to the presence of spring and mass elements as explained above, the system will, with the damping mechanism omitted, vibrate more readily at one certain frequency than at other frequencies. If the actuating force is suddenly removed when the system is displaced from its normal position, the crystal unit 1 will return the system to its normal position but the kinetic energy stored in the motion converting device 5 and other parts will carry the pen beyond the normal position, and to and fro oscillation of the arm will result. In an oscillograph and similar devices, this free oscillation or oscillation on removal of an actuating force is undesirable, as is also the above mentioned tendency to vibrate with greater ease at one particular frequency.

To prevent the above effects this invention provides the damping mechanism already described and indicated in its entirety by the numeral 15.

Now in operation when the moving parts of the vibratory device are vibrating at low frequencies the bar 16 is vibratorily twisted but due to its length the twist per unit of length is very small and a negligible amount of energy is absorbed from the system. If desired, the bottom end of the bar may be unsupported and in this case the entire damping mechanism oscillates as a whole at low frequencies without twisting of the bar 16. At these low frequencies the masses 17, 18 and 19 oscillate with the bar and the complete damping mechanism 15 acts substantially as an additional mass. At somewhat higher frequencies the inertias of the masses 17, 18 and 19 react to cause flexing of the bar 16 with resultant absorption of energy from the vibrating system. In some cases it has been observed that at least the first mass, 17, oscillates vigorously at one frequency and out of phase with the spindle 7, causing a large angular flexing of the bar 16a between mass 17 and the spindle. By properly proportioning the sections 16a, 16b, and 16c of the bar 16 and discs 17, 18 and 19, the combination may, if desired, be made to absorb a maximum amount of energy at the resonant frequency of the device and thus reduce or eliminate the tendency in the latter toward free oscillations and accentuated response.

The determination of the correct proportions for the damping mechanism may readily be accomplished by trial and error methods guided by a knowledge of the fundamental mechanics involved. It is convenient to start with a rather long bar, 16, of damping material and one disc, 17. The disc is moved along the length of the bar until maximum reduction of the resonant response of the device is obtained. Then discs of other sizes and bars of other cross sections are tried in various combinations with a comparison of results. In tuning the system it should be kept in mind that substituting a disc 17 of greater moment of inertia and/or increasing the spacing of the disc from the spindle lowers the frequency at which maximum damping effect is obtained. Substituting a bar of the same material but of greater cross section raises the frequency of maximum damping. For any given bar dimensions, substituting material of greater stiffness raises the frequency at which maximum damping occurs. The amount of damping obtained depends on the nature of the material. After the optimum damping effect has been obtained by this means, if the damping bar were to be cut off directly below disc 17, the damping device would then consist of a single tuned damping unit having many of the characteristics of the prior art damping units referred to above.

We have found by experience that it is often difficult to obtain exactly the right amount of damping with a damping unit such as last referred to and made up of a bar and single disc of convenient size. It often happens that proper tuning of the single disc system results in reduction of response at the original resonant frequency and the introduction of two new frequencies of maximum response, one above and one below the original resonant frequency. The essence of this invention lies in our discovery that by providing damping means which are adapted to absorb and dissipate energy received from the above described tuned damping unit, the response of the device may be improved as will presently be illustrated. The additional means according to the preferred form of this invention comprise further damping or energy dissipating material arranged to be distorted by the disc 17. This additional material may or may not be loaded by additional discs.

It appears that the additional damping material modifies the vibrations of the original damping unit in a manner to broaden the frequency versus damping characteristic of that section. We have found that for damping the oscillograph device illustrated, the tuned damping unit provided by the first disc and the portion 16a of bar 16 should preferably be coupled to a plurality of modifying elements comprising additional portions 16b and 16c of vibration dissipating bar 16 carrying spaced discs 18 and 19. The characteristics of the modifying elements may be adjusted by trial and error in a manner similar to that described above after suitable proportions have been found for the main or primary unit. It will be noted that the device of Fig. 8 is not merely a plurality of tuned damping units coupled to the vibratory device but rather is a combination of damping units, each one arranged to modify the performance of an adjacent unit. When the bar 16 is supported at its lower end by a clamp, as in Figs. 1 and 2, the section of bar 16 between clamp 20 and mass 19 serves to modify the performance of the sections above to an extent depending on the spacing of clamp 20 from mass 19. The modifying effect of one unit on the other is a distinguishing characteristic of our devices and accompanies the use in the devices of adjacent elements which are dissimilar. This will be understood more fully through reference to Fig. 8. There, the main unit consisting of disc 17 and portion 16a of bar 16, and the auxiliary unit consisting of disc 18 and the portion 16b of bar 16 may be considered as two separate units which are physically coupled together at an interface lying in the plane of the lower face of disc 17. Adjacent elements of the units at the point of coupling are the disc 17 and the portion 16b of bar 16, and it will be noted that these adjacent elements are dissimilar both physically and functionally, the disc being an inertia element while the bar is predominantly an energy dissipating element.

To illustrate further the action of the damping means, the damping effects of the unit thus composed of bar 16 and discs 17, 18 and 19 are shown graphically in Fig. 9. The curves there included illustrate the amplitude of motion of the pen 11 produced when a sinusoidal voltage of constant amplitude and variable frequency is applied to the crystal unit 1. The device for which these curves were plotted was proportioned as shown in Figs. 1, 2 and 3 and was scaled on the basis of box 2 being approximately 3¾ inches square. Curve 21 illustrates the response of the pen device described above when the damping means are disconnected. Curve 22 represents the response when a short clamped bar of damping material is connected to the spindle, the dimensions of the bar being approximately those shown in the Gravley Patent No. 2,149,216. Curve 23 shows the response of the pen device with the damping means of this invention, proportioned substantially as shown in Figs. 1 and 2, substituted for the damping bar of curve 22. The device for which this curve was plotted had discs 17, 18 and 19 of steel and bar 16 of polymerized vinyl chloride of the type currently known as Koroseal.

It will be seen from curve 21 that the crystal unit 1 drives the motion converting mechanism 5 and pen 10 with substantially uniform amplitude at the lower frequencies. The peak in the response curve at the higher frequencies is due to mechanical resonance in the system. Introduction of a clamped bar of damping material is shown by curve 22 to materially reduce the response at the resonant frequency and also to reduce it at all other frequencies. Reduction of the resonance response is, of course, desirable, but reduction at other frequencies is undesirable since the sensitivity is thereby lowered. Moreover, it will be obvious that even if a reduction in sensitivity is tolerated, the response at the resonant frequency is still so much greater than elsewhere that serious distortion occurs in the records obtained from the device.

However, when the damping device of this invention is employed, it will be seen from curve 23 that practically uniform response is obtained over the whole range of frequencies, and furthermore, that sensitivity in the lower frequencies remains practically undiminished. The damping device accordingly is frequency-selective; that is, it may be adjusted to damp (reduce the amplitude of) only vibrations of certain frequencies without appreciably damping vibrations of lower frequencies. Satisfactory transient response of the device is obtained when it is damped with the improved damping means, that is, the pen does not continue to oscillate when actuating forces are removed.

Those skilled in the art will appreciate that the damping device of this invention may be used at other frequencies than those indicated in Fig. 9, and is applicable in general to any vibrating system which requires selective damping. As will be understood, the adaptation of this damping unit to other devices may be made by reproportioning the constants of the unit to correspond with those required in the other device, due consideration being taken of the elasticity of the damping material, its internal friction or damping properties, the inertia effects of the masses, and their spacing upon the bar of damping material. While discs are shown in the drawings, it will be evident that other configurations may be used without altering the kind of results which may be obtained. Furthermore, the various sections of the damping bar 16 may be made of separate bodies of homogeneous damping material or of bodies of composite damping material. In addition, different damping materials or combinations of material may be inserted between successive masses. Fig. 10 illustrates a few of the numerous variations of structure which may be made in accordance with the principles of our invention, and shows a mass 24 provided with hubs 25 and 26 on opposite sides thereof surrounding a central opening 27 into which sections of damping material may be inserted. The section of the damping member inserted in hub 25 is composed of three layers of material, two layers 29, 29 being of the same composition, while layer 30 is of a different composition. These layers may be cemented together or otherwise secured into a substantially integral mass, or they may merely be held together at their ends by pin 28. The damping member inserted in hub 26 is composed of two layers 31 and 32 of different compositions. In addition to the foregoing modifications, various alternative structures of mass 24 will also occur to those skilled in the art; the structure shown in Fig. 10 is intended to illustrate only one of the many modifications which can be used.

It has been pointed out above that the vibrations of spindle 7 are not strictly torsional, due to its combined translational and oscillatory motions. Since it is not necessary that the axis of torsion remain stationary in order to obtain the results described above, the term "torsional vibration" as used in the claims is intended to include vibrations which are not strictly torsional, the only requirement being that the bar of damping material be so arranged that torsional oscillations may be induced in the bar. Furthermore, it is intended that the terms "oscillation," "torsional oscillation" and "torsional vibration" be regarded as synonymous. When the term "vibration" is used alone, it is intended to be generic to all types of vibrations.

Having now disclosed the invention, what we claim is:

1. A frequency-selective damping device adapted to damp the vibrations of a system which includes a member oscillating substantially about an axis, which device comprises an elongated body of elastic damping material disposed substantially in axial alignment with said oscillating member and adapted to have one of its ends torsionally vibrated thereby, and a plurality of masses disposed along the length of said elongated body and secured thereto to vibrate therewith, the inertias of said masses, their spacing from each other and from said end of said elongated body, the damping properties of said damping material and its elasticity being mutually adapted to produce the desired frequency-selective characteristics whereby vibrations at some frequencies may be damped while vibrations at lower frequencies remain substantially undamped.

2. A frequency-selective damping device adapted to absorb energy selectively from a vibrating system which includes a member oscillating substantially about an axis, which device comprises an elongated body of elastic vibration dissipating material adapted to be torsionally distorted by said oscillating member, said body being provided with a plurality of masses distributed along its length and adjustably secured thereto to vibrate therewith, said adjustability permitting the spacing of said masses from each other and from said member to be varied to alter the maghitude of the damping effect and the frequency of maximum damping.

3. A frequency-selective damping device as claimed in claim 1 wherein three masses of equal moments of inertia are provided on said elongated body.

4. A damping device adapted to selectively receive and dissipate the excess energy of a torsionally vibrating member, said device comprising an elongated body of elastic damping material having a plurality of masses spaced along its length, said body being suspended from said vibrating member and adapted to be torsionally distorted thereby.

5. In combination, a vibrating system having a member which oscillates substantially about an axis, and damping means cooperating therewith to damp vibrations at some frequencies without materially damping vibrations at lower frequencies, said damping means comprising an elongated body of elastic damping material having a plurality of masses distributed along its length, said body being adapted to be torsionally distorted by said oscillating member.

6. In a piezo-electric device, a vibratory motion-converting device adapted to be actuated by a piezo-electric unit and frequency-selective damping means adapted to be torsionally distorted by said converting device, said damping means comprising an elongated body of elastic vibration dissipating material having a plurality of masses distributed along its length.

7. The method of tuning a selective damping unit comprising an elongated body of elastic vibration dissipating material, which method comprises the steps of vibrating said elongated body at a desired frequency by means of a vibrating member coupled to one end of said body, positioning a first mass between the ends of said elongated body, adjusting the position of said mass with respect to the coupled end of said elongated body to cause maximum absorption of vibratory energy in the portion of said body included therebetween, positioning a second mass on said elongated body with said first mass between it and said vibrating member, and adjusting the position of said second mass with respect to the first thereby to obtain a desired modification of the damping effect of the first mentioned portion of said elongated body.

8. A selective damping device comprising the combination of: a tuned damping unit effective in dissipating energy over a restricted frequency range; and vibration dissipating means for modifying the damping effect of said tuned unit by absorbing and dissipating energy received therefrom, said means being energized solely by the said tuned unit.

9. A selective damping device as claimed in claim 8 wherein said vibration dissipating means include elastic vibration dissipating material.

10. A selective damping device as claimed in claim 8 wherein said vibration dissipating means include vibration dissipating material having rigid mass coupled thereto to vibrate therewith.

ALFRED L. W. WILLIAMS.
JOSEPH J. NEFF.